Figures 1, 2, 3:
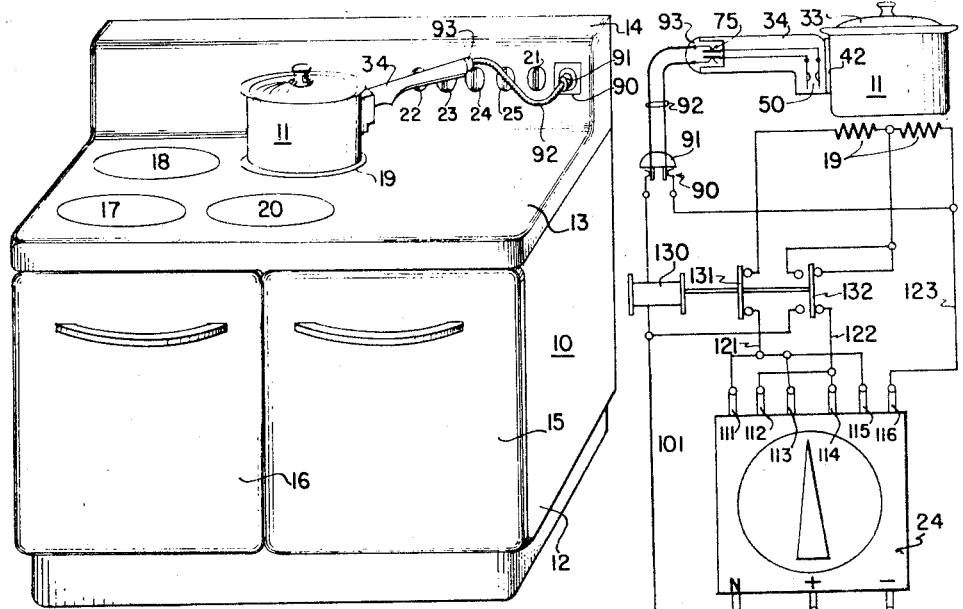

Nov. 21, 1950     L. F. BERG ET AL     2,530,643

THERMAL CONTROLLED COOKING VESSEL

Filed March 26, 1948

INVENTOR.
Leo F. Berg,
Walter R. McDowell
BY
Smith, Olsen & Baird
Attys

Patented Nov. 21, 1950

2,530,643

UNITED STATES PATENT OFFICE 2,530,643

THERMAL CONTROLLED COOKING VESSEL

Leo F. Berg, Oak Park, and Walter R. McDowell, Westchester, Ill., assignors to Hotpoint Inc., a corporation of New York Application March 26, 1948, Serial No. 17,248

4 Claims. (Cl. 200—136.5)

The present invention relates to thermal controlled cooking vessels, and more particularly to such a vessel that is arranged selectively to control heating thereof by the associated heating unit of an electric range.

In cooking on an electric range the manually operable multi-position control switch for a given surface heating unit is normally operated to its high position in order to cause heating of the heating unit at the corresponding high heating rate, and a cooking vessel containing food to be cooked is placed upon the heating unit. Subsequently, after the temperature of the food contained in the vessel is raised from the ambient temperature to a cooking temperature, the control switch is operated to its low position in order to cause heating of the heating unit at the corresponding low heating rate. This subsequent operation of the control switch is ordinarily necessary in order to prevent the food contained in the vessel from boiling over and spilling on the cooking top of the range supporting the heating unit. Moreover, there is usually no advantage in causing vigorous boiling of food incident to cooking thereof, and some economy in the consumption of electric energy by the range may be effected by reducing the heating rate of the heating unit after the cooking temperature has been reached by the food contained in the supported vessel.

However, the time interval between initiation of heating at a high heating rate and cooking at a low heating rate is considerably variable depending upon many factors including the character and quantity of the food being cooked as well as the ambient temperature. For example, the interval may be considerably protracted when it is necessary first to thaw frozen foods. Thus the cook must ordinarily make repeated observations of the initial step in the cooking process in order to determine the proper time to operate the control switch from its high position to its low position to effect the required reduction in the heating rate of the heating unit employed.

Accordingly, it is a general object of the present invention to provide an improved thermal controlled cooking vessel for governing the heating rate of the heating unit of an electric range arranged in heat exchange relation with the vessel.

Another object of the invention is to provide an improved thermal controlled cooking vessel for effecting a reduction in the heating rate of the heating unit employed when a predetermined cooking temperature in the associated cooking vessel is reached.

A further object of the invention is to provide in a cooking vessel, improved temperature-responsive electric control facility.

Further features of the invention pertain to the particular arrangement of the elements of the cooking vessel, whereby the above-outlined and additional operating features thereof are attained.

The invention, both as to its organization and method of operation, together with further objects and advantages thereof, will best be understood by reference to the following specification taken in connection with the accompanying drawing, in which Figure 1 is a perspective view of an electric range and a cooking vessel supported by one of the heating units carried by the associated cooking top and embodying the present invention; Fig. 2 is an enlarged fragmentary vertical sectional view of the handle carried by the cooking vessel shown in Fig. 1, illustrating the details of the electric control elements incorporated therein; and Fig. 3 is a diagrammatic illustration of the heating and control circuits and facility incorporated in the electric range and in the cooking vessel.

Referring now to Fig. 1 of the drawing, there is illustrated an electric range 10 and a cooking vessel 11 embodying the features of the present invention. More particularly, the range 10 comprises an upstanding frame or body 12 provided with a substantially horizontally disposed cooking top 13 terminating adjacent to the rear thereof in an upwardly extending backsplasher 14. The body 12 comprises an oven disposed in the right-hand portion thereof below the cooking top 13 and having an open front closed by a suitable door 15, the door 15 being hinged adjacent to the lower edge thereof in a manner not shown. Also the body 12 comprises a storage space disposed in the left-hand portion thereof below the cooking top 13 and receiving movable drawer structure 16. The left-hand upper surface of the cooking top 13 carries four surface heating units 17, 18, 19 and 20. The oven is provided with a heating circuit including a multi-position control switch 21 of the rotary type mounted upon the backsplasher 14; and the heating units 17, 18, 19 and 20 are respectively provided with heating circuits respectively including multi-position control switches, 22, 23, 24 and 25 of the rotary type mounted upon the backsplasher 14. The heating units 17, 18, 19 and 20 are arranged in a substantially rectangular pattern upon the left-hand upper surface of the cooking top 13 and are hereinafter respectively referred to as the left front, the left rear, the right rear and the right front surface heating units.

As shown in Fig. 2, the cooking vessel 11 is formed of aluminum or the like and comprises a substantially cylindrical side wall 31 provided with a connecting bottom wall, not shown, and an open top having an outwardly flared rim 32 that is adapted internally to receive the outwardly flared rim of a cooperating removable cover 33. Also the vessel 11 comprises a hollow handle, indicated generally at 34, and including an inner hollow housing 35 that is substantially rectangular in vertical cross-section and a connecting substantially cylindrical outwardly directed tubular sleeve 36, the housing 35 and the sleeve 36 being formed integrally of die cast aluminum or the like. The inner end of a tube 37, formed of die cast aluminum or the like, is arranged within the sleeve 36 and rigidly secured thereto, the extreme inner end of the tube 37 abutting an end wall 38 of the housing 35. The interior of the tube 37 communicates through an aligned opening 39 formed in the end wall 38 with a cavity 40 formed in the housing 35. A hollow handle gripping element 41 is arranged mutually over the outer end of the tube 37 and the outer end of the sleeve 36 and is mutually rigidly secured thereto, the handle element 41 being formed of a suitable thermal insulating material that is also impervious to water, such as Bakelite or the like.

The inner open end of the housing 35 is normally closed by an upstanding substantially rectangular shoe 42 removably secured in watertight relation with the inner end of the housing 35 by screws or the like, not shown. The shoe 42 is formed of die cast aluminum or other good thermal-conducting material and has an upstanding partially cylindrical face or surface 43 adapted nicely to fit the associated cylindrical side wall 31. A downwardly turned flange 31a, also formed of aluminum or the like, is rigidly secured to the upper portion of the cylindrical side wall 31 just below the outwardly flared rim 32 in order to provide an overhanging shoulder adapted to receive an upstanding toe 44 formed on the upper end of the shoe 42. Also a threaded element 45, formed of aluminum or the like, is rigidly secured to the cylindrical side wall 31 just below the heel of the shoe 42 and arranged to receive a screw 46 extending through an opening formed in a downwardly projecting lug 47 carried by the lower portion of the housing 35. Specifically, the screw 46 normally projects through the opening formed in the lug 47, and the shank thereof is threaded into the opening formed in the element 45; whereby the housing 35 is normally removably secured to the cylindrical side wall 31, the surface 43 provided on the shoe 42 nicely fitting the cylindrical side wall 31 so that the shoe 42 is normally disposed in good heat conducting relation with the cylindrical side wall 31. Of course, it will be understood that the handle 34, as a whole, may be removed from the cylindrical side wall 31 by removing the screw 46 and then tilting it upwardly so that the heel of the shoe 42 passes over the element 45 permitting the toe 44 of the shoe 42 to be disengaged from the overhanging flange 31a. Subsequently the handle 34, as a whole, may be again replaced upon the cylindrical side wall 31 in a reverse manner and secured in place by the screw 46.

As previously noted the connection between the shoe 42 and the housing 35 is water-tight; whereby the cavity 40 formed within the housing 35 is closed to the exterior but communicates through the opening 39 with the interior of the tube 37. However, the shoe 42 may be removed from the end of the housing 35 by removing the screws, not shown, permitting access to the interior of the cavity 40. The shoe 42 constitutes a portion of a thermostatic control switch 50 carried thereby and arranged within the cavity 40. Specifically, the thermostatic control switch 50 comprises the hose or shoe 42 and a thermal-responsive element 51 of the bi-metallic type, the upper end of which is rigidly secured to the upper portion of the shoe 42 in good heat conducting relation therewith by an arrangement including a rivet 52. The lower portion of the shoe 42 carries an outwardly projecting lug 53 having a threaded opening therein into which an adjustable screw 54 is arranged and secured in adjusted position by a surrounding lock-nut 55. The upper end of the screw 54 terminates in a semi-spherical pivot or support 56; and a substantially U-shaped resilient steel thrust-spring or leaf-spring 57 is arranged between the pivot 56 and the lower end of the bi-metallic element 51. Specifically, the lower end of the leaf-spring 57 has a depression 58 formed therein which receives the upper end of the pivot 56; and the upper end of the leaf-spring 57 has a saddle 59 formed therein that receives a substantial knife edge provided on the lower end of the bi-metallic element 51. When the shoe 42 is cold the bi-metallic element 51 is biased in the clockwise direction toward the shoe 42 by virtue of the internal stresses therein; whereby the extreme upper end of the leaf-spring 57 is moved into engagement with an outwardly extending abutment or stop 60 carried by the shoe 42 and limiting further movement of the bi-metallic element 51 and the leaf-spring 57 toward the shoe 42.

Also the thermostatic control switch 50 comprises an outwardly projecting element 61 carrying an insulating plate 62 supporting two spaced-apart electrical terminals 63 and 64. The inner end of the terminal 64 terminates in a stationary contact 65 which cooperates with a movable contact 66 carried by insulating structure 67 supported by the bi-metallic element 51 adjacent to the lower end thereof; the movable contact 66 being electrically connected to the terminal 63 by a flexible conductor 68. Accordingly, the contacts 65 and 66 are normally disengaged electrically disconnecting the terminals 63 and 64, when the shoe 42 is cold. As the shoe 42 is heated, the temperature of the bi-metallic element 51 is raised causing the bi-metallic elements to be biased in the counter-clockwise direction away from the shoe 42, which initial movement is restrained by the leaf-spring 57. However, when the bias of the bi-metallic element 51 away from the shoe 42 becomes sufficiently great the opposing bias of the leaf-spring 57 is overcome causing the bi-metallic element 51 and the leaf-spring 57 to move away from the shoe 42 with a snap action; whereby the movable contact 66 engages the stationary contact 65 in order electrically to connect the terminals 63 and 64. The temperature at which the thermostatic switch 50 is operated from its open position to its closed position as described above is determined jointly by the temperature of the shoe 42 and by the initial bias upon the leaf-spring 57 as established by the adjusted position of the screw 54. Accordingly, by suitably adjusting the screw 54, the initial bias upon the leaf-spring 57 may be varied; whereby the temperature at which the thermostatic switch 50 is operated from its open position to its closed position may be selectively established. After the operating temperature of the thermostatic switch has thus been established by appropriately adjusting the screw 54, the lock-nut 55 is again set in order to retain the adjustment mentioned. In the present example, the screw 54 is so adjusted that the thermostatic switch 50 is operated from its open position to its closed position when the shoe 42 is heated by the cylindrical side wall 31 as a consequence of the contents of the vessel 11 reaching a temperature of approximately 210° F. or slightly below the normal boiling point of water.

Of course, when the vessel 11 is removed from the associated heating unit the cylindrical side wall 31, and consequently the shoe 42, cool; and when a predetermined lower temperature is reached by the shoe 42, the bias of the bi-metallic element 51 toward the shoe 42 overcomes the opposing bias of the leaf-spring 57; whereby the bi-metallic element 51 and the leaf-spring 57 are moved toward the shoe 42 with a snap action causing the extreme upper end of the leaf-spring 57 to engage the outer end of the stop 60 in order to limit further movement thereof. Thus the movable contact 66 is moved into disengagement with the stationary contact 65 with a snap action electrically disconnecting the terminals 63 and 64.

The outer end of the handle element 41 has a recess 71 formed therein into which a tubular sleeve 72 is arranged, the inner end of the tubular sleeve 72 being internally threaded as indicated at 73 and receiving an externally threaded portion of the outer end of the tube 37 as indicated at 74. The sleeve 72 is formed of a suitable electrical insulating material that is also impervious to water, such as Bakelite or the like, and is sealed to the surrounding wall of the handle element 41. Moreover, the joint between the threaded portions 73 and 74 of the sleeve 72 and of the tube 37, respectively, is water-tight; and the handle element 41 is sealed both to the tube 37 and to the sleeve 36 as previously noted. A plug 75 formed of electrical insulating material that is also impervious to water, such as Bakelite or the like, is arranged within the opening formed in the sleeve 72 and sealed to the surrounding wall thereof; which plug 75 has imbedded therein two male electric terminals or connecting elements 76 and 77 arranged in spaced-apart relation. Accordingly, the plug 75 being formed of water impervious material seals the plug elements 76 and 77 in place within the sleeve 72 in order to provide an electric connector or plug disposed wholly within the recess 71 and impervious to water. The inner ends of the plug elements 76 and 77 are hollow and are electrically wired by two conductors 78 and 79, respectively, to the terminals 63 and 64. Specifically, one end of the conductor 78 is arranged within the hollow plug element 76 and brazed or otherwise secured in place; and the other end of the conductor 78 is suitably secured to the terminal 63 by a removable screw 80. Likewise, one end of the conductor 79 is arranged within the hollow plug element 77 and brazed or otherwise secured in place; and the other end of the conductor 79 is suitably secured to the terminal 64 by a removable nut 81. Finally, the conductors 78 and 79 are provided with suitable high temperature insulating jackets 82 and 83, respectively, that may be of the braided type. Accordingly, the plug 75 disposed wholly within the recess 71 formed in the handle element 41 and comprising the plug elements 76 and 77 is electrically connected by the conductors 78 and 79 extending through the tube 37 to the terminals 63 and 64 carried by the insulating plate 62. Thus it will be understood that the thermostatic switch 50 is operative selectively to complete and to interrupt the electrical connection between the plug elements 76 and 77.

Since the inner end of the housing 35 is completely closed by the shoe 42, and since the recess 71 formed in the outer end of the handle element 41 is completely closed by the plug 75 and the sleeve 72, and since the handle element 41 is impervious to water, the vessel 11, as a whole, may be immersed in water incident to washing thereof without water entering the cavity 40 and the interior of the tube 37 and the consequent damage to the electrical equipment. This arrangement is very advantageous as it is not necessary to detach or to remove the handle 34 from the cylindrical wall 31 incident to washing or storing the vessel 11. Moreover, since the plug elements 76 and 77 of the plug 75 are disposed entirely within the recess 71 formed in the outer end of the handle element 41 there is no danger of injury thereto incident to storing the vessel 11 by contacting other stored cooking equipment.

Also the backsplasher 14 carries a receptacle 90 of the female type adapted detachably to receive a plug 91 of the male type carried by one end of a detachable connector or insulated conductor cable 92. The other end of the cable 92 carries a socket 93 of the female type that is adapted to be detachably connected to the plug 75 arranged in the outer end of the handle element 41. Preferably, the receptacle 90 is of unique construction adapted to receive the cooperating plug 91 of the unique construction mentioned but is of such character that it is not capable of accepting a conventional outlet plug provided on an extension cord associated with an electric toaster or other appliance. This arrangement permits ready insertion of the plug 91 into the receptacle 90, but prevents improper insertion of conventional outlet plugs thereinto. Also the socket 93 is so constructed and arranged that it may be readily received within the recess 71 formed in the outer end of the handle element 41 and supported thereby in engagement with the plug 75 arranged therein. Finally, the cable 92 is of a predetermined length such that when the connector or plug 91 is in engagement with the connector or receptacle 90 and the connector or socket 93 is in engagement with the connector or plug 75 arranged within the outer end of the handle 34, the vessel 11 may be supported on the right rear surface heating unit 19, but the vessel 11 may not be supported on any of the other surface heating units 17, 18 and 20. In other words, the cable 92 is not long enough to establish the connection mentioned between the backsplasher 14 and the handle 34 and to permit the vessel 11 to be supported by any surface unit other than the right rear surface unit 19. This arrangement is very advantageous as it permits control by the thermostatic switch 50 incorporated in the vessel 11 of the circuit network associated with the receptacle 90 only when the vessel 11 is supported by the right rear surface unit 19, which, in turn, is governed by the circuit network mentioned, as more fully explained hereinafter.

Considering now the heating and control circuit arrangement in greater detail, the range 10 comprises, as shown in Fig. 3, a source of current supply of the three-wire Edison type, which may be 230 volts A. C., including a neutral conductor 101 and two other conductors 102 and 103, hereinafter referred to as "outside" conductors. As previously noted, the heating and control circuit of the right rear surface heating unit 19 comprises a multi-position switch 24 of the rotary type that is adapted operatively to connect the heating unit 19 to the source mentioned. Preferably the switch 24 is of the six-position rotary type disclosed in U. S. Patent No. 2,203,236, granted on June 4, 1940 to Charles P. Randolph. This rotary switch 24 comprises off, high, second, third, low and warm control positions; wherein corresponding circuit connections are established between the source mentioned and the heating element 19 in accordance with Figs. 6 to 11, respectively, of the drawings in the Randolph patent. Specifically, the switch 24 comprises the three power terminals illustrated that are respectively connected to the conductors 101, 102 and 103 of the source mentioned and six load terminals 111, 112, 113, 114, 115 and 116 that are operatively connected to the heating unit 19 in a manner more fully explained hereinafter. Specifically, the load terminals 111, 113 and 115 are connected to a conductor 121; the load terminals 112 and 114 are connected to a conductor 122; and the load terminal 116 is connected to a conductor 123. When the switch 24 occupies its off position, the power conductors 101, 102 and 103 are disconnected from each of the load terminals 111 to 116, inclusive, by the switching mechanism incorporated in the casing thereof. When the switch 24 occupies its high position, the power conductor 103 is commonly connected to the load terminals 115 and 116 and the power conductor 102 is connected to the load terminal 114. When the switch 24 occupies its second position, the power conductors 102 and 103 are respectively connected to the load terminals 114 and 116. When the switch 24 occupies its third position, the power conductors 102 and 103 are respectively connected to the load terminals 113 and 116. When the switch 24 occupies its low position, the power conductors 101 and 103 are respectively connected to the load terminals 112 and 116. When the switch 24 occupies its warm position the power conductors 101 and 103 are respectively connected to the load terminals 111 and 116.

Also the switching apparatus incorporated in the circuit network comprises, in addition to the multi-position rotary switch 24, a relay 130 provided with a bridging element 131 normally closing back contacts extending between the conductor 121 and the left-hand outer terminal of the heating unit 19, the heating unit 19 being of the two-section type. Also the relay 130 includes a bridge element 132 normally closing back contacts extending between the conductor 122 and the mid-tap of the heating unit 19 and adapted to close front contacts extending between the power conductor 101 and the mid-tap of the heating unit 19. Finally, the conductor 123 is directly connected to the right-hand terminal of the heating unit 19. Accordingly, it will be understood that when the relay 130 occupies its restored position, the connections between the heating unit 19 and the source of current are selectively established directly by the rotary switch 24. Specifically, when the rotary switch 24 occupies its off position, the heating unit 19 is disconnected from the source mentioned. When the rotary switch 24 occupies its high position the two sections of the heating unit 19 are connected in multiple across the outside conductors 102 and 103 of the source. When the rotary switch 24 occupies its second position, the right-hand section of the heating unit 19 is connected across the outside conductors 102 and 103 of the source. When the rotary switch 24 occupies its third position, the two sections of the heating unit 19 are connected in series across the outside conductors 102 and 103 of the source. When the rotary switch 24 occupies its low position, the right-hand section of the heating unit 19 is connected across the neutral conductor 101 and the outside conductor 103 of the source. When the rotary switch 24 occupies its warm position, the two sections of the heating unit 19 are connected in series across the neutral conductor 101 and the outside conductor 103 of the source. Thus it will be understood that when the rotary switch 24 occupies any one of its control positions, other than its off position, the heating unit 19 is heated at a corresponding rate and that the outside conductor 103 of the source is connected to the conductor 123. Finally, in the circuit network the winding of the relay 130 is connected between the neutral conductor 101 of the source and one terminal of the receptacle 90; while the conductor 123 is directly connected to the other terminal of the receptacle 90.

Considering now the operation of the range 10 in conjunction with the vessel 11, the cook places the food to be cooked into the vessel 11 and then places the vessel 11 upon the right rear heating unit 19. Then the plug 91 is inserted into the receptacle 90 and the socket 93 is inserted into the recess 71 formed in the outer end of the handle 34; whereby the socket 93 engages the plug 75. As previously noted when the detachable connector 92 is arranged between the receptacle 90 and the handle 34, it is possible to place the vessel 11 only upon the right rear heating unit 19. At this time the cover 33 is placed upon the vessel 11 and the associated rotary switch 24 is operated to its high position. Also, at this time the thermostatic switch 50 occupies its open position since the shoe 42 is cold; whereby the relay 130 occupies its restored position rendering the heating circuit of the right rear heating unit 19 entirely under the control of the rotary switch 24. Since the rotary switch 24 occupies its high position, the two sections of the heating unit 19 are connected in multiple across the outside conductors 102 and 103 of the source causing the heating unit 19 to develop heat at a high rate. Specifically, the outside conductor 103 is connected via the load terminal 116 to the conductor 123 and consequently to the right-hand terminal of the heating unit 19; the outside conductor 103 is connected via the load terminal 115, the conductor 121 and the back contacts associated with the bridging element 131 to the left-hand terminal of the heating unit 19; and the outside conductor 102 is connected via the load terminal 114, the conductor 122 and the back contacts associated with the bridging element 132 to the mid-tap of the heating unit 19.

The vessel 11 and the contained food to be cooked is accordingly heated at a high rate by the heating unit 19; whereby the temperature of the shoe 42 rises from the ambient temperature; and when the food contained in the vessel 11 reaches a temperature of approximately 210° F., the thermostatic switch 50 is operated from its open position to its closed position. At this time the food contained in the vessel 11 has just begun to boil and will continue vigorous boiling shortly unless the rate of heating of the heating unit 19 is reduced; whereby the food contained in the vessel 11 may boil over and spill upon the heating unit 19 and the associated cooking top 13. However, this accident is prevented in the present arrangement by virtue of the fact that the thermostatic switch 50 is operated from its open position to its closed position at this time, completing a circuit extending between the neutral conductor 101 and the outside conductor 103 for energizing the winding of the relay 130; whereby the relay 130 is operated. The circuit mentioned extends from the neutral conductor 101 via the winding of the relay 130, one conductor of the receptacle-plug 90—91, one conductor in the cable 92, one conductor in the socket-plug 93—75, one conductor in the handle 34, the contacts of the thermostatic switch 50, the other conductor in the handle 34, the other contact of the socket-plug 93—75, the other conductor in the cable 92, the other conductor in the receptacle-plug 90—91, the conductor 123 and the switching mechanism in the casing of the rotary switch 24 to the outside conductor 103.

Upon operating the relay 130 interrupts, at the bridging element 131 and the associated back contacts and at the bridging element 132 and the associated back contacts, the initial circuit established between the source and the heating unit 19 by the rotary switch 24; and completes, at the bridging element 132 and the associated front contacts, an alternative heating circuit between the source and the heating unit 19 via the rotary switch 24. Specifically, the outside conductor 103 is connected via the switching apparatus in the casing of the rotary switch 24 by way of the load terminal 116 and the conductor 123 to the right-hand terminal of the heating unit 19; and the neutral conductor 101 is directly connected by the bridging element 132 and the associated front contacts to the midtap of the heating element 19. Accordingly, upon operating the relay 130 interrupts the initial circuit for connecting the two sections of the heating unit 19 in multiple across the outside conductors 102 and 103 and corresponding to a high heating rate; and completes the alternative circuit for connecting the right-hand section of the heating unit 19 across the neutral conductor 101 and the outside conductor 103 and corresponding to a low heating rate. Thus at this time the switching apparatus, as a whole, including the rotary switch 24 and the contacts controlled by the operated relay 130, occupies a low heat position; whereby the vessel 11 and the contained food is heated by the heating unit 19 at the low heating rate in order to prevent undue boiling of the contained food. This arrangement is very advantageous in view of the fact that it not only conserves electric energy, but it also prevents undue vigorous boiling of the food contained in the vessel 11 and the likelihood of the contained food boiling over upon the heating unit 19 and the associated cooking top 13.

Should the cook subsequently remove the cover 33 from the vessel 11 and add into the contained food a great quantity of very cold water there is the possibility that the temperature of the cooking food is lowered sufficiently to effect cooling of the shoe 42 to such an extent that the thermostatic switch 50 is operated from its closed position to its open position. In this event, when the thermostatic switch 50 is operated from its closed position to its open position, the circuit for retaining operated the relay 130 is interrupted, causing the relay 130 to restore in order to recomplete the initial circuit for supplying heat to the heating unit 19 at the high rate. Thereafter, when the contents of the vessel 11 is heated to a temperature of approximately 210° F., the shoe 42 is again heated in order to effect operation of the thermostatic switch 50 from its open position to its closed position; whereby the relay 130 is reoperated in order again to complete the alternative circuit for supplying heat to the heating unit 19 at the low rate. Accordingly, the thermostatic switch 50 is operative not only to reduce the heating rate of the heating unit 19 in response to heating of the contents of the vessel 11 to the predetermined cooking condition previously mentioned, but it is also operative to increase the heating rate of the heating unit 19 in response to cooling of the contents of the vessel 11 below the predetermined cooking condition previously mentioned.

In the normal operation of the apparatus the thermostatic switch 50 reduces the heating rate of the heating unit 19 after the contents of the vessel 11 is heated to the predetermined cooking condition mentioned and thereafter cooking of the contents of the vessel 11 proceeds at the low rate for the required time interval dependent upon the character of the food undergoing the cooking process. After the food contained in the vessel 11 has been appropriately cooked, the cook operates the rotary switch 24 to its off position, thereby interrupting the connection between the outside conductor 103 and the conductor 123 and consequently interrupting the alternative circuit for supplying heat to the heating unit 19 and the circuit for retaining operated the relay 130. Thus the relay 130 restores, further interrupting the alternative circuit for supplying heat to the heating unit 19 and again preparing the initial circuit for supplying heat to the heating unit 19. However, no further heat is actually supplied to the heating unit 19, since the rotary switch 24 occupies its off position. At this time the cook removes the detachable cable 92 withdrawing the plug 91 from the receptacle 90 and withdrawing the socket 93 from the plug 75 arranged in the outer end of the handle 34. The vessel 11 may then be removed from the heating unit 19 utilizing the thermally insulating handle element 41 of the handle structure 34.

After the contents of the vessel 11 has been removed to a suitable dish, the vessel 11, as a whole, may be washed as there is no danger of water entering the internal structure of the handle 34 and damaging the electrical apparatus incorporated therein, including the thermostatic switch 50. Since the electrical apparatus incorporated in the handle structure 34 is rigidly secured in place no particular care must be exercised in washing the vessel 11 or in placing it in storage after use. In passing it is noted that since the detachable cable 92 terminates in the plug 91 and in the socket 93, there is no danger of short-circuits or false control of the relay 130 should either the plug 91 become disengaged from the receptacle 90 or the socket 93 become disengaged from the plug 75 incorporated in the handle 34 incident to operation of the range 10 in conjunction with the vessel 11. Specifically, should the plug 91 become disengaged from the receptacle 90, all of the exterior circuits are disconnected; and on the other hand, in the event the socket 93 should become disengaged from the plug 75 incorporated in the handle 34, there is no danger of short-circuits or false operation of the relay 130 as the socket 93 being of the female type is not capable of completing a circuit even though it does strike the metal cooking top 13. In utilizing the range 10 in conjunction with the vessel 11 there is no possibility of damaging the cable 92 by heating it since the cable 92 is too short to extend over any one of the heating units 19, etc., the cable 92 being only long enough to reach between the back-splasher 14 and the handle 34 when the vessel 11 is supported upon the heating unit 19.

In view of the foregoing it is apparent that there has been provided an improved cooking vessel that is selectively operative to control heating thereof by the associated heating unit of an electric range.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A cooking vessel comprising wall structure, an elongated handle, means including cooperating parts respectively carried by said wall structure and by the inner end of said handle for detachably securing the inner end of said handle to said wall structure, a cavity formed in the inner end of said handle adjacent to said wall structure and closed to the exterior, a thermostatic control switch arranged within said cavity and disposed in good heat conducting relation to said wall structure, a recess formed in the outer end of said handle and open to the exterior, an electrical connecting fixture secured within said recess to said handle and closing the interior of said handle to the exterior and adapted detachably to receive another cooperating connecting fixture from the exterior, and wiring extending through said handle and interconnecting said control switch and said first-mentioned connecting fixture.

2. A cooking vessel comprising substantially cylindrical upstanding metal wall structure, an elongated handle having first and second open-ended recesses respectively formed in the inner and outer ends thereof, a metal plate secured to the inner end of said handle and closing the open end of said first recess and defining a cavity in the inner end of said handle closed to the exterior, said plate having a substantially partially cylindrical upstanding concavity formed in the outer surface thereof and adapted to receive a portion of said wall structure, means including cooperating parts respectively carried by said wall structure and by the inner end of said handle for detachably securing said plate to said wall structure in good heat conducting relation thereto, a thermostatic control switch arranged in said cavity and disposed in good heat conducting relation to said plate, a connecting fixture secured within said second recess to said handle and sealing the interior of said handle to the exterior and adapted detachably to receive another cooperating connecting fixture from the exterior, and wiring extending through said handle and interconnecting said control switch and said first-mentioned connecting fixture.

3. A cooking vessel comprising wall structure, an elongated handle, means including cooperating parts respectively carried by said wall structure and by the inner end of said handle for detachably securing the inner end of said handle to said wall structure, a cavity formed in the inner end of said handle adjacent to said wall structure and closed to the exterior, a thermostatic control switch arranged within said cavity and disposed in good heat conducting relation to said wall structure, a recess formed in the outer end of said handle and open to the exterior, a plug arranged within said recess and adapted to receive a cooperating detachable socket from the exterior, an opening formed through said handle and communicating between said cavity and said recess, and wiring arranged in said opening and interconnecting said control switch and said plug, said plug being impervious to water and sealed to the surrounding wall of said handle and the wall of said handle being impervious to water so that said vessel as a whole may be immersed in water incident to washing thereof without water entering into said cavity or said opening and the consequent damage to said control switch and said wiring.

4. A cooking vessel comprising wall structure, an elongated handle, means including cooperating parts respectively carried by said wall structure and by the inner end of said handle for detachably securing the inner end of said handle to said wall structure, a cavity formed in the inner end of said handle adjacent to said wall structure and closed to the exterior, a thermostatic control switch arranged within said cavity and disposed in good heat conducting relation to said wall structure, a recess formed in the outer end of said handle and open to the exterior, a plug arranged within the inner end of said recess and closing the interior of said handle to the exterior and adapted to cooperate with a socket detachably secured in the outer end of said recess, said plug including outwardly directed contact elements wholly disposed within said recess so that the end of said handle protects them against injury incident to washing of said vessel as a whole, and wiring extending through said handle and interconnecting said control switch and said plug.

LEO F. BERG.
WALTER R. McDOWELL.

REFERENCES CITED

The following references are of record in the file of this patent:

UNITED STATES PATENTS

| Number | Name | Date |
| --- | --- | --- |
| 2,061,419 | Ettinger et al. | Nov. 17, 1936 |
| 2,207,871 | Myers | July 16, 1940 |
| 2,410,013 | Clark | Oct. 29, 1946 |
| 2,422,974 | Newell | June 24, 1947 |
| 2,440,128 | Sullivan | Apr. 20, 1948 |